(12) United States Patent
Tanaka

(10) Patent No.: US 7,032,458 B2
(45) Date of Patent: Apr. 25, 2006

(54) MOBILE MEASUREMENT SYSTEM OF THREE-DIMENSIONAL STRUCTURE

(75) Inventor: Takafumi Tanaka, Owariasahi (JP)

(73) Assignee: National University Corporation Nagoya University, Nagoya (JP)

(*) Notice: Subject to any disclaimer, the term of this patent is extended or adjusted under 35 U.S.C. 154(b) by 77 days.

(21) Appl. No.: 10/882,301

(22) Filed: Jul. 2, 2004

(65) Prior Publication Data

US 2005/0028611 A1  Feb. 10, 2005

(30) Foreign Application Priority Data

Jul. 7, 2003  (JP) .............................. 2003-192977

(51) Int. Cl.
*G01L 1/24*  (2006.01)
(52) U.S. Cl. .......................... 73/800; 382/154; 348/47; 351/221; 356/141.1
(58) Field of Classification Search .................... 73/800
See application file for complete search history.

(56) References Cited

U.S. PATENT DOCUMENTS

| | | | | | |
|---|---|---|---|---|---|
| 5,023,446 | A | * | 6/1991 | Gleine ................... 250/227.16 |
| 5,257,089 | A | * | 10/1993 | Stetson ........................ 356/520 |
| 5,394,752 | A | * | 3/1995 | Reda ............................ 73/800 |
| 5,426,498 | A | * | 6/1995 | Brueck et al. .............. 356/35.5 |
| 5,783,752 | A | * | 7/1998 | Thorburn et al. ............. 73/800 |
| 6,008,905 | A | * | 12/1999 | Breton et al. ................ 356/402 |
| 6,204,916 | B1 | * | 3/2001 | Norita et al. ............. 356/141.1 |
| 6,267,477 | B1 | * | 7/2001 | Karpol et al. ................ 351/221 |
| 6,356,298 | B1 | * | 3/2002 | Abe et al. ....................... 348/47 |

\* cited by examiner

*Primary Examiner*—Edward Lefkowitz
*Assistant Examiner*—Linda P. Field
(74) *Attorney, Agent, or Firm*—Oliff & Berridge, PLC

(57) ABSTRACT

This invention relates to a mobile measurement system of three-dimensional structure comprises a measuring equipment 5 to measure three-dimensional structure of an object for measurement and a barrow 4 for moving measurement which the equipment 5 is mounted. The measuring equipment 5 has a digital camera 5a, a slit floodlight 5b, and a three-dimensional structure calculating device that calculates and outputs three-dimensional structure of the object by using a light plane range-finding method from the each position and direction of the floodlight and the camera and the picture that is taken by the camera. The barrow has an measurement position and direction calculating device that calculate the each position of the floodlight and the camera, the direction of the floodlight, the direction of the camera at the measurement by the equipment in accordance with an information of self-contained navigation from an acceleration sensor 9 and a rotation angle sensor 10 that detects an acceleration and a rotation angle of the barrow, respectively, and an information of moving distance from the wheel revolution sensor 8 and transmit the result of the calculation to the three-dimensional structure calculating device 7.

7 Claims, 2 Drawing Sheets

MOBILE MEASUREMENT SYSTEM OF THREE-DIMENSIONAL STRUCTURE

BACKGROUND OF THE INVENTION

1. Field of the Invention

The present invention relates to a mobile measurement system of three-dimensional structure to measure a three-dimensional structure of the measuring object such as plant community and the others with non-destruction, non-contact and over a broad area.

2. Description of Related Art

A result of the measurement of the three-dimensional structure of a plant community is used as one of the characteristic of the dynamism of a wood (a kind of plant life) or a forest (a kind of plant community) to evaluate it ecologically. Therefore, the measurement of the three-dimensional structure of a plant community with non-destruction and non-contact is important and, for example, the inventor of this invention suggests the technique of the structure measurement with a laser plane range-finding method (T. Tanaka, J. Yamaguchi and Y. Takeda: "Measurement of forest canopy structure with a laser plane range-finding method—development of a measurement system and applications to real forests", Agricultural and Forest Meteorology 91, pp 149–160, 1998).

However, the measurement of the three-dimensional structure of a plant community by using a laser plane range-finding method must be executed by following steps:

1) Locate a slit floodlight to illuminates slit light to the plant community and a digital still camera to take a picture of the plant community which is illuminated by the slit light from the direction of across that of the slit light at a predetermined position.

2) Take a plurality of pictures of the plant community according to the various directions of the illumination of the slit light by change the directions of the illumination of the floodlight.

3) Obtain the three dimensional structure of the plant community by combining the position and the direction of the floodlight and the camera at the taking each pictures and each pictures of the plant community by the camera to obtain the cross-sectional structure of the plant community. Thereby, there is a problem that the characteristic of the structure of the forest is hard to be fully comprehended because the measurement is only carried out within a narrow area as the range of 20 m–50 m from the floodlight and the camera which are located at the predetermined position, respectively.

To solve the problem, there was attempted to a moving measurement by locating the equipments such as rails, a crane and an aerial railway and executing the measurement with obtaining the various locations of the flood and the camera. However, this measurement has further problems that there is costly and troublesome to locate the equipments, and the equipments has a risk that it will makes a damage to the environment of the plant community.

Furthermore, there was also attempted to another moving measurement with obtaining the locations of the various locations of the flood and the camera by global positioning system (GPS), but this measurement in turn has a problem that the measurement by GPS is not able to executed in the area such as in the forest, or the other area such as under the forest canopy because the electric wave from the GPS satellite is hard to reach such area.

SUMMARY OF THE INVENTION

The object of this invention is to solve the above-mentioned problem advantageously. A mobile measurement system of three-dimensional structure of this invention comprises a measuring equipment for measuring three-dimensional structure of a measurement object, a barrow for moving measurement which the measuring equipments are mounted and is driven by one wheel that contacts with a travel surface, said measuring equipment is composed by a slit floodlight to illuminates slit light to the measurement objects, a digital still camera to take a picture of said object which is illuminated by the slit light from the direction of across that of the slit light, a three-dimensional structure calculating device which calculates and outputs the three-dimensional structure of said object by using a light plane range-finding method from the each position of said floodlight and the camera, the direction of the illumination of the slit light of said floodlight, the direction of taking a picture of said camera, and the picture which is taken by the camera, said barrow has a rotation angle sensor which detects the rotation angles around the mutually orthogonal three axes, a wheel revolution sensor which detects the revolution of the wheel and, a measurement position and direction calculating device that calculate the each position of said floodlight and the camera, the direction of the illumination of the slit light of said floodlight, the direction of taking a picture of said camera at the measurement by said equipment in accordance with an information of self-contained navigation from said rotation angle sensor and an information of moving distance from said wheel revolution sensor and transmit the result of the calculation to said three-dimensional structure calculating device.

In the mobile measurement system of three-dimensional structure of this invention, the barrow with the measuring equipments is driven by hand gilding of an operator or power from a source of power such as motor which is equipped with this barrow and is traveled on a travel surface such as a trackless cant in a forest, a punishing road, a construction field, an archaeological site and a narrow aisle at a disaster site by one wheel is contact with the travel surface like a ground surface, road surface and a floor face. In the traveling of the barrow for measurement, a rotation angle sensor detects the rotation angle of this barrow around the mutually orthogonal three axes which these axes are extended along such as the longitudinal direction, the transversal direction and the up-and-down direction of the barrow respectively, a wheel revolution sensor detects a revolution of the wheel, and the measurement position and direction calculating device calculate the each position of said floodlight and the camera, the direction of the illumination of the slit light of said floodlight, the direction of taking a picture of said camera at the measurement by said equipment in accordance with an information of self-contained navigation from said rotation angle sensor and an information of moving distance from said wheel revolution sensor and transmit the result of the calculation to said three-dimensional structure calculating device.

And, in the measurement by the measuring equipment which is mounted the barrow during drive or stop of the barrow accordingly, the slit floodlight illuminates the slit light to the object of the measurement, the digital still camera takes a picture of the object which is illuminated the slit light from the direction across that of the slit light, and the three-dimensional structure calculating device calculates the three-dimensional structure of the object by a light plane range-finding method from the each position of said floodlight and the camera by the measurement position and direction calculating device, the direction of the illumination of the slit light of said floodlight, the direction of taking a picture of said camera, and the picture which is taken by the camera and outputs the result of the calculation in the form of such as display on the screen or record in the storage device.

Therefore, according to the mobile measurement system of three-dimensional structure of this invention, when the measurement of the object in a broad area for instance, to fully comprehend the structure of forest is executed, a moving measurement can be executed without the location of the equipments such as rails, a crane and an aerial railway as conventional measurement, so that the measurement will be executed with low cost because of no expense for the location of the equipments and no troublesome tasks, and without the damage of the environment of the plant community and the like. Additionally, the measurement can be executed within forest or the other area such as under the forest canopy where the electric wave from the GPS satellite is hard to reach.

Additionally, in the mobile measurement system of three-dimensional structure of this invention, said slit floodlight of the measuring equipment may include a laser line marker, so that the measurement of the three-dimensional structure by light plane range-finding method can be executed more precisely because the laser slit floodlight can illuminate strong, fine and clear laser beam.

Moreover, in the mobile measurement system of three-dimensional structure of this invention, said slit floodlight of the measuring equipment may be a rotary laser floodlight which can turn the direction of the illumination of said slit light by rotating said laser line marker. According to this rotary laser floodlight, since it will be able to carry out the measurement in the certain area like the conventional measurement at each measurement point under the moving measurement, when the measurement is carried out as stop the barrow on the way of the moving measurement with making intervals of measurement, these intervals of measurement between each measurement point can be broadened and the time and the work of the measurement can be reduced.

Furthermore, the mobile measurement system of three-dimensional structure of this invention, said slit floodlight of the measuring equipment may be a liquid crystal projector. So that since the liquid crystal projector has a high durability of vibration and safety in personam compared with a laser light source, the durability and the safety on the activation at the measurement of the equipment will be increased.

Furthermore, the mobile measurement system of three-dimensional structure of this invention, said slit floodlight of the measuring equipment may illuminate slit light of a plural wavelength simultaneously or selectively. According to using lights with a plural wavelength, the construction of the object of measurement will be understood from the difference of the partial spectro-characteristics of reflectivity of the object. For example, since foliage in the forest has a higher reflectivity of visible green light and near-infrared light and a lower reflectivity of visible red light than trunk and branch, it will be able to differentiate the foliage from the trunk and branch from the picturized image by illuminating the slit lights of two kind of wavelength selectively.

Furthermore, the mobile measurement system of three-dimensional structure of this invention, said barrow may further comprises an acceleration sensor which detects the acceleration of the barrow that directed to the mutually orthogonal three axes, and said measurement position and direction calculating device may uses an information of self-contained navigation from said acceleration sensor to calculate the each position of said floodlight and the camera, the direction of the illumination of the slit light of said floodlight, the direction of taking a picture of said camera at the measurement by said equipment. So that, since the acceleration sensor detects the accelerations of the barrow such as in the directions of the mutually orthogonal three axes which these axes are extended along such as the longitudinal direction, the transversal direction and the up-and-down direction of the barrow respectively, and the measurement position and direction calculating device uses these accelerations to calculate the each position of said floodlight and the camera, the direction of the illumination of the slit light of said floodlight, the direction of taking a picture of said camera, if the additional acceleration of the barrow is occurred by an impact or the like, an error from the additional acceleration at the calculation of the each position and the each direction of the slit floodlight and the digital still camera will be reduced.

Moreover, according to the measurement method of this invention, the measurement of the three-dimensional structure will be executed with low cost because of no expense for the location of the equipments and no troublesome tasks, and without the damage of the environment of the plant community and the like.

DETAILED DESCRIPTION OF THE PREFERRED EMBODIMENT

Figure 1:
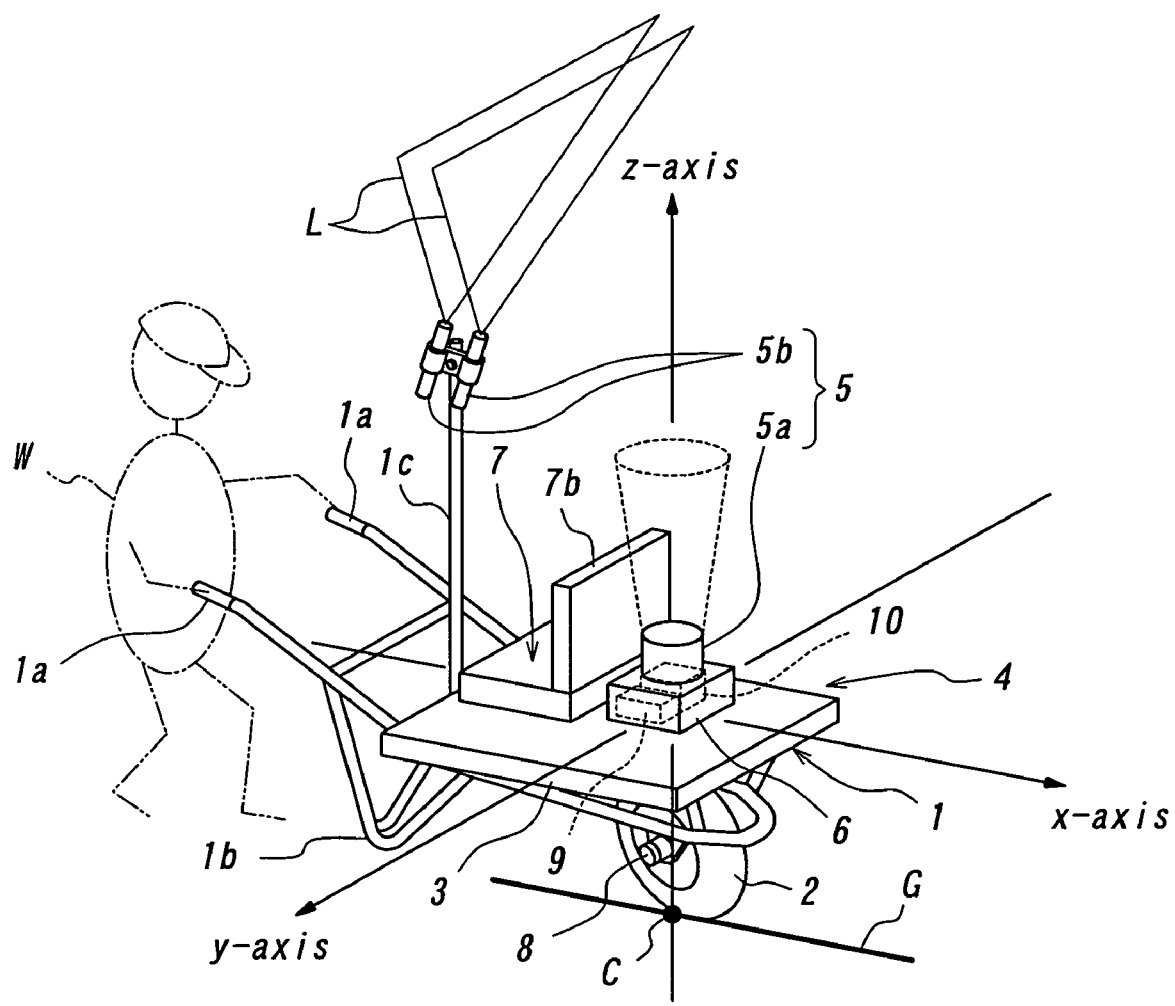
FIG. 1 is schematically perspective view of the appearance of the mobile measurement system of three-dimensional structure for measuring plant community as one embodiment of the mobile measurement system of three-dimensional structure of this invention.
Figure 2:
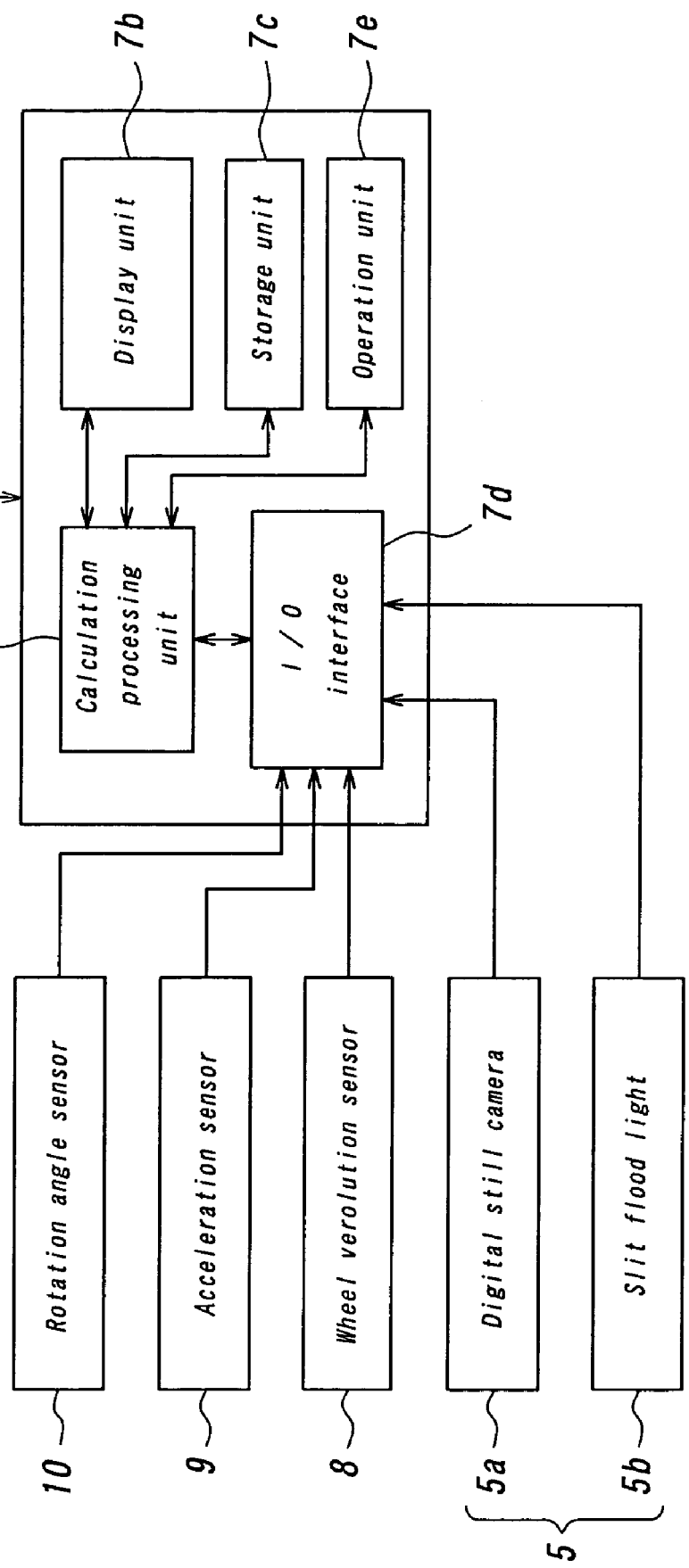
FIG. 2 is a block diagram of the composition of the measuring equipment that is mounted on the mobile measurement system of three-dimensional structure for measuring plant community of the embodiment of this invention.

The embodiment according to this invention will be explained, by way of example, with reference to the accompanying drawings, in which FIG. 1 is schematically perspective view of the appearance of the mobile measurement system of three-dimensional structure for measuring plant community as one embodiment of the mobile measurement system of three-dimensional structure of this invention, and FIG. 2 is a block diagram of the composition of the measuring equipment which is mounted on the mobile measurement system of three-dimensional structure for measuring plant community of the embodiment of this invention.

As shown in FIG. 1, the mobile measurement system of three-dimensional structure for measuring plant community of this embodiment comprises a mobile barrow 4 which has a frame 1 with a handle for hand gilding and two stems for stay (there only shows one of the stems in the drawing), a wheel 2 which is rotatably supported around the axis at the underneath of frame 1 and a top plate 3 which is mounted on frame 1, this barrow 4 is driven by hand gilding drive of a measurement operator W and by means of the wheel 2 which contact on the grounding point C of the ground level G as the driving surface. The barrow 4 further comprises a digital still camera 5a which is one of a component of an measuring equipment 5, an angle and acceleration sensor unit 6, a commercially available laptop computer 7 as a three-dimensional structure calculation device and a measurement position and direction calculating device, and a portable power supply (not shown), a slit floodlight 5b which is one of a component of the measuring equipment 5 and is mounted on the top of the column 1c which is made from aluminum and set up at the backward of frame 1 with about 120 cm length each of which are mounted to the top plate 3, and a wheel revolution sensor 8 which is mounted on the frame 1 and detects the revolution of wheel 2. The angle and acceleration sensor unit 6 contains an acceleration sensor 9 which detects the acceleration of the barrow 4 in the directions of mutually orthogonal three axes, that is, x-axis, y-axis and z-axis respectively, and a rotation angle sensor 10 which detects the rotation angle of the barrow 4 around the mutually orthogonal three axes, that is, x-axis, y-axis and z-axis respectively.

The barrow 4 is made from a commercially available two-wheel barrow (for example, CC3-2FA made by Showa Bridge Sales Co., Ltd.) by removing its original two wheels which are line up on the axis which is extended to the transversal direction, instead one wheel 2 is mounted the intermediate position between where the original two wheels were mounted, and removing its original plastic body, alternatively the flat top plate 3 of plywood is mounted on the frame 1 as this plate is approximately horizontal when a person stands and keep the handle 1a holding. The wheel revolution sensor 8 is consisted from two potentiometers (for example, CPP-45RBN 22.7 kΩ made by NIDEC COPAL ELECTRONICS Corp.) which are placed on the axle of the wheel 2 serially. Since this potentiometer has a dead angle that cannot detect its angle, so these potentiometers are positioned to locate its each dead angle are staggered at 180° each other to prevent these potentiometers are in dead angle at the same time.

The angle and acceleration sensor unit 6 is consisted from commercially available products (for example, three axes angle sensor GU-3024 made by Datatec Co., Ltd.), as shown in FIG. 1, the acceleration sensor 9 is positioned to make its x-axis is extended to parallel with the x-axis of specific coordinate system of the barrow 4 which is extended along the longitudinal direction of the barrow 4 and is parallel to the surface of the top plate 3, and its y-axis is extended to parallel with the y-axis of specific coordinate system of the barrow 4 which is extended along the transversal direction of the barrow 4 and is parallel to the surface of the top plate 3, and its z-axis is extended to parallel with the z-axis of specific coordinate system of the barrow 4 which is extended along the up-and-down direction of the barrow 4 and is orthogonal to the surface of the top plate 3, and the rotation angle sensor 10 which is consisted by a gyro that is housed in the sensor is positioned to make its x-axis is extended along the longitudinal direction of the barrow 4 to be identical with the x-axis of specific coordinate system of the barrow 4, and its y-axis is extended along the transversal direction of the barrow 1 to be identical with the y-axis of specific coordinate system of the barrow 4, and its z-axis is extended to be orthogonal with the axle of the wheel 2 at the center of the wheel and to be identical with the z-axis of specific coordinate system of the barrow 4 at the up-and-down direction of the barrow 4. The portable power supply which is not shown in the drawings is a built-in battery inverter (for example, a portable power supply Z-130 made by SWALLOW ELECTRIC Co., Ltd.) which out put AC100V power to the angle and acceleration sensor 6 and the personal computer 7 as a power supply.

Additionally, in this embodiment, the data of three-dimensional acceleration and the data of three-dimensional angle that are respectively detected by the acceleration sensor 9 and the rotation angle sensor 10 in the angle and acceleration sensor unit 6 are input to the laptop computer 7 through RS232C cable. Each terminal for power source of two potentiometers which consists the wheel revolution sensor 8 are connected together in parallel to make a parallel circuit, and fixed resistor of 20 kΩ is connected the circuit in serial. A power of about 6V by four size D batteries that are connected in serial is impressed to whole of the circuit and the resistor, the three voltage value, that is, the voltage of both ends of the parallel circuit (V0) which is consisted by two potentiometers and each voltage of the terminals (variable resistance intermediate terminal) of both of each potentiometers (V1, V2) are input independently to the laptop computer 7 via A/D converter circuit card (for example, REX-5054U made by RATOC Systems Inc.) which is inserted in the card slot of the laptop computer 7.

Moreover, the digital still camera 5a of the equipment 5 construct from commercially available product (for example, CCD monochrome digital video camera module XCD-X700 made by Sony Corp.). In this embodiment, as shown in FIG. 1, this camera 5a is mounted on the top plate 3 to point the optic axis of the camera to directly above of the top plate (that is, the upper direction from the barrow 4 which is orthogonal to the surface of the plate 3) to take a picture of the plant community as the object of measurement. The power of the camera 5a is supplied by the above-specified portable power supply. The image data that are output from the camera 5a are input to the laptop computer 7 via IEEE1394 interface card (for example, REX-CBFW1-L made by RATOC Systems Inc.) that is inserted in other card slot of the computer 7.

Furthermore, the slit floodlight 5b of the equipment 5 is also constructed by two kind of commercially available laser line marker with different wavelength (for example, laser unit with variable optical system SU-42C-685-A40 (red laser of 685 nm wavelength) and SU-42C-830-A40 (near-infrared laser of 830 nm wavelength) made by Audio-Technica Corp.). In this embodiment, as shown in FIG. 1, the slit floodlight 5b is mounted on the top of the alminum column 1c to point the floodlight 5b upwards and incline it to some degree on the side of the digital still camera 5a as the direction of the slit is parallel to the axle of the barrow 4 in order that the slit light illuminate the plant community as object of the measurement. The above-mentioned four size D batteries that are connected in serial of about 6V when the switch is turned on by hand at the picturizing of the camera 5a supply the power of the slit floodlight 5b.

Furthermore, as shown in FIG. 2, the laptop computer 7 comprises a calculation processing unit 7a having a central processing unit (CPU), a display unit 7b with a liquid crystal display, a storage unit 7c with some storage device such as a memory and a hard disk drive, I/O interface 7d with the above-mentioned interface card in the card slot, and an operation unit with some operation device such as keyboard. Thereby, the computer 7 processes the measurement data from the above-mentioned measuring equipments in accordance with a program which is previously stored in the memory as described later, then output the result of the data processing on the screen of the display unit 7b together with the measurement data from the measuring equipment 5 and stores the data in the storage unit 7c, furthermore, calculate and output the three-dimensional structure of the plant community as the object of the measurement from the above-mentioned data. In addition, the output voltage V1, V2 of the two potentiometers of the wheel revolution sensor 8 are converted to the rotation angle of the wheel 2 to select the output value from V1/V0 or V2/V0 which is not a value of its dead angle.

In the moving measurement of plant communication such as timber of forest by using the mobile measurement system of three-dimensional structure for measuring plant community of this embodiment, at first, the laptop computer 7 is turn on and the moving measurement program activate, and the angle and acceleration sensor unit 6 is turn on and the acceleration sensor 9 and the rotation angle sensor 10 activate. The computer 7 executes the program and utilizes the position of x-axis, y-axis and z-axis of the sensor unit 6 at the activation as a fundamental coordinate system in the data processing.

Subsequently, as the measurement operator W drives the barrow 4 by hand gilding, the computer 7 calculates the moving distance of the barrow 4 in real time from the rotation angle of the wheel 2 which is converted from the output data of the potentiometer of the wheel revolution sensor 8 and the outer diameter of the wheel 2, after that the computer 7 calculates the current position of the barrow 4, then, the measuring equipment 5 by decomposing the moving distance to the each components in the directions of x-axis, y-axis and z-axis of the fundamental coordinate system with the use of the three-dimensional direction angle of the posture of the barrow 4 from the output data from the rotation angle sensor 10, moreover, the computer 7 calculates the present position and the zenithal angle and the azimuthal angle of the direction for the measurement of the equipment 5 by using the three-dimensional angle of the posture of the barrow which are obtained from the output data from the rotation angle sensor 10, then, the computer 7 stores these calculated data in the hard disk drive of the storage unit 7c.

Furthermore, when the operator activates the measuring equipment 5 during drive the barrow or stop the barrow accordingly (the operator illuminates the timber to the slit light of two slit floodlight sequentially, and take a picture of the timber by the camera 5a), the computer 7 processes the image data of the timber according to the two kind of wavelength of the laser that are sequentially output from the camera 5a and makes the data in the form of the predetermined data as the results of the measurement, then stores these results in the hard disk drive of the storage unit 7c associate with the present position and the present orientation of the measurement of the equipment 5.

Since it cannot be expected that the operator will be able to drive the barrow 4 by hand gilding with keeping up the top plate 3 with parallel to the inclination of the ground level G of the longitudinal direction of the barrow 4, it is necessary to be previously checked the tilt value of the top plate 3 on the ground level G of the flat land when the operator holds the handle 1a of the barrow 4 with respect to different plural operators and input each of the tilt value to the computer 7. Thereby, the computer 7 will compensate the rotation angle of the barrow that is output from the rotation angle sensor 10 to the amount of the each tilt value.

Moreover, if the revolution status of the wheel 2 which based on the output data from the wheel revolution sensor 8 does not correspond to the generation status of the acceleration which based on the output data of the acceleration sensor 9 (for example, in the case that an acceleration for longitudinal direction is detected although the wheel is not revolving), it is presumed that the acceleration of the barrow 4 is generated by impact or the like and the wheel 2 does not revolve corresponding to the amount of the actual moving distance, so that the computer 7 will perform integration of the acceleration that is detected by the acceleration sensor 9 in two times to obtain the moving distance of the wheel 2 at the direction of the acceleration, and compensate the moving distance that is previously calculated from the rotation angle of the wheel 2 according to the distance which is calculated from the detected acceleration.

Furthermore, the computer 7 calculate the moving trajectory of the barrow 4 from the transition of the present position of the measuring equipment 5, and display the moving trajectory of the barrow 4 in a map or a plan view on the liquid crystal display of the display unit 7b, in addition, the result of the measurement of the equipment 5 is displayed on the liquid crystal display of the display unit 7b with the above-described moving trajectory or by switching the display image.

Additionally, when the moving measurement of the mobile measurement system of three-dimensional structure is terminated, the laptop computer 7 reads the data of the each position of the digital still camera 5a and the slit floodlight 5b, the each direction of the illumination of the floodlight and the picturizing of the camera 5a and the image data that is taken by the camera 5a, calculate the three-dimensional coordinate of the each timber of the forest, then, obtain the three-dimensional structure of the forest and, consequently, output the three-dimensional structure of the forest in the form of the image on the liquid crystal display of the display unit 7b and the storage data of the hard disk drive of the storage unit 7c.

To calculate the three-dimensional coordinate of the each timber by light plane range-finding method, at first, the three-dimensional coordinate of the timber in a local coordinate system that is fixed on the barrow 4 obtains. In this local coordinate system, the y-axis is parallel to the axle of the barrow 4, and z-axis is set to correspond with the optic axis (that is, the direction of picturizing) of the camera 5a. At this point, if the angle θ is defined as the angle between the slit light and the x-axis of the local coordinate system and the angle α is defined as the angle between each direction of specific scope of the picture element of the image pickup device of the camera 5a and the y-z plane of the local coordinate system and the angle β is defined as the angle between each direction of specific scope of the picture element of the image pickup device of the camera 5a and the x-z plane of the local coordinate system, the following equations are formed with respect to one picture element of the camera that corresponds with a reflection point of the slit light, and the local three-dimensional coordinate of the reflection point of the slit light is obtained by the calculation of the equations.

$$x = z \tan \alpha \quad (1)$$

$$y = \sqrt{x^2 + z^2} \tan \beta \quad (2)$$

$$z = d/(1/\tan \theta - \tan \alpha) \quad (3)$$

In the equation (3), the value d indicates the x coordinate value of the intersection point of the plane that includes the optic axis of the slit light and the x-axis. Each value of α, β of the picture element of the image pickup device of the camera 5a are measured previously and stored in the laptop computer 7 as the data file.

Subsequently, the absolute coordinates of the reflection point of the slit light calculate. The laptop computer 7 reads the posture data and the position data of the barrow from the hard disk drive, coordinate converting the local coordinate system by rotating coordinate conversion with the use of the posture data of the barrow, additionally coordinate converting the previously converted coordinate system by parallel shift coordinate conversion and, consequently, the absolute coordinate is derived from the above-mentioned calculations.

Therefore, according to the mobile measurement system of three-dimensional structure of this invention, when the measurement of the object in a broad area for instance, to fully comprehend the structure of forest is executed, a moving measurement can be executed without the location of the equipments such as rails, a crane and an aerial railway as conventional measurement, so that the measurement will be executed with low cost because of no expense for the location of the equipments and no troublesome tasks, and without the damage of the environment of the plant community and the like. Additionally, the measurement can be executed within forest or the other area such as under the forest canopy where the electric wave from the GPS satellite is hard to reach.

Moreover, according to the mobile measurement system of three-dimensional structure of this embodiment, the slit floodlight of the measuring equipment 5 is constructed by the laser line marker, and this laser line marker can illuminate strong, fine and clear laser beam, so that the measurement of the three-dimensional structure by light plane range-finding method can be executed more precisely.

In general, there is known that foliage in the forest has a spectro-characteristics of reflectivity that the reflectance of the visible green light and near-infrared light are higher than that of trunk and branch. According to the mobile measurement system of three-dimensional structure of this invention, since the slit floodlight 5b of the measuring equipment 5 can illuminate two kinds of light with different wavelengths, that is, the visible green light and the near-infrared light selectively, it will be able to differentiate the foliage from the trunk and branch from the picturized image by illuminating these slit lights of two kind of wavelength. Consequently, it will understand how the forest has a construction.

Additionally, according to the mobile measurement system of three-dimensional structure of this embodiment, the computer 7 continuously calculates the position of the equipment 5 and calculates a moving pathway of the barrow 4 in accordance with the transition of the position of the equipment 5 and display the pathway of the barrow, so that an measurement operator in moving measurement and a researcher who analyzes measurement data in afterward can check the moving pathway of the barrow 4 in the moving measurement on the screen, so that the operator always can check the current position to prevent the risk of distress and the researcher will be able to carry out a detailed analysis of the data in reference to another data such as land features together.

Although this invention is explained above in accordance with the embodiment, this invention is not limited by the embodiment. For example, the mobile measurement system of three-dimensional structure of this invention is available for the measurement of three-dimensional structure of the construction or the group of structure in the field such as a forest area, a construction field, an archaeological site and a disaster site, so that a quick and accurate moving measurement of such measuring object can easily carry out.

Moreover, in this invention, the slit floodlight 5b of the measuring equipment 5 may be a rotary laser floodlight which can turn the direction of the illumination of the slit light by rotating a laser line marker with single wavelength or two laser line marker with two different wavelength. According to this rotary laser floodlight, since it will be able to carry out the measurement in the certain area like the conventional measurement at each measurement point under the moving measurement, when the measurement is carried out when the barrow stops at certain intervals, these intervals of measurement between each measurement point can be broadened and the time and the work of the measurement can be reduced.

Furthermore, in this invention, the slit floodlight 5b of the measuring equipment 5 may be a liquid crystal projector. So that since the liquid crystal projector has a high durability of vibration and safety in personam compared with a laser light source, the durability and the safety on the activation at the measurement of the equipment will be increased. If the liquid crystal projector uses as the slit floodlight, the differentiation of the foliage and trunk and branch may be carried out by illuminating either visible green light or visible red light to the measuring object by switching these lights with respect to the time of pictureizing.

Additionally, when the barrow of this invention is used on the relatively flat and nonskid travel surface such as pavement, the acceleration sensor that detects the acceleration of the barrow in the directions of mutually orthogonal three axes may be omitted. Moreover, the barrow of this invention may be mounted the source of the power such as motor to aid the hand gilding by the operator or moving itself as the operator holds the handle.

Furthermore, the barrow of this invention is not limited to hand gilding, but can also be driven by an animal such as a horse or a donkey by holding the member of the barrow like handle with the use of an appropriate piece of equipment.

Consequently, according to the mobile measurement system of three-dimensional structure of this invention, it can obtain such following useful data.

(1) Two-Dimensional Profile of the Forest Canopy Structure Across the Forest

If the moving measurement in the forest carry out along several hundred meters, the cross sectional image of the forest that the forest cut off at the vertical plane along the pathway of the measurement will be obtain, so that the real state of the structure of the forest, that is, what-like the tree having height and width will be able to display visually.

(2) Spatial Distribution Map of the Minimal Height of Living Branch

A value of the minimal height of living branch that indicates the lowest height of a living branch of a tree measured from the ground is important ecologically. According to the moving measurement in the forest with the use of the system of this invention, the average value and the standard deviation of the minimal height of living branch in the forest can obtain, furthermore, the spatial mal-distribution of the minimal height of living branch in the forest can survey. Moreover, at the determination of the living branch, the above-mentioned spectro-characteristic of the reflectivity is available.

The invention claimed is:

1. A mobile measurement system of three-dimensional structure comprising:
   Measuring equipment for measuring three-dimensional structure of a measurement object,
   A barrow for moving measurement which measuring equipments are mounted and is driven by one wheel that contacts with a travel surface,
   Said measuring equipment is composed by:
   A slit floodlight to illuminates slit light to the measurement objects, A digital still camera to take a picture of said object which is illuminated by the slit light from the direction of across that of the slit light and, A three-dimensional structure calculating device which calculates and outputs the three-dimensional structure of said object by using a light plane range-finding method from the each position of said floodlight and the camera, the direction of the illumination of the slit light of said floodlight, the direction of taking a picture of said camera, and the picture which is taken by the camera, Said barrow has a rotation angle sensor which detects the rotation angles around the mutually orthogonal three axes, a wheel revolution sensor which detects the revolution of the wheel and, a measurement position and direction calculating device that calculates the each position of said floodlight and the camera, the direction of the illumination of the slit light of said floodlight, the direction of taking a picture of said camera at the measurement by said equipment in accordance with an information of self-contained navigation from said rotation angle sensor and an information of moving distance from said wheel revolution sensor and transmit the result of the calculation to said three-dimensional structure calculating device.

2. A mobile measurement system of three-dimensional structure according to claim 1, wherein, Said slit floodlight of the equipment includes a laser line marker.

3. A mobile measurement system of three-dimensional structure according to claim 2, wherein, Said slit floodlight of the equipment is a rotary laser floodlight which can turn the direction of the illumination of said slit light by rotating said laser line marker.

4. A mobile measurement system of three-dimensional structure according to claim 1, wherein, Said slit floodlight of the equipment is a liquid crystal projector.

5. A mobile measurement system of three-dimensional structure according to claim 1, wherein, Said slit floodlight of the equipment can illuminate slit light of a plural wavelength.

6. A mobile measurement system of three-dimensional structure according to claim 1, wherein, Said barrow further comprising an acceleration sensor which detects the acceleration of the barrow that directed to the mutually orthogonal three axes and, Said measurement position and direction calculating device uses an information of self-contained navigation from said acceleration sensor to calculate the each position of said floodlight and the camera, the direction of the illumination of the slit light of said floodlight, the direction of taking a picture of said camera at the measurement by said equipment.

7. A measurement method using the system according to claim 1.

* * * * *